Patented May 9, 1933

1,908,312

UNITED STATES PATENT OFFICE

EDGAR C. BRITTON AND RALPH F. PRESCOTT, OF MIDLAND, MICHIGAN, ASSIGNORS TO THE DOW CHEMICAL COMPANY, OF MIDLAND, MICHIGAN, A CORPORATION OF MICHIGAN

SEPARATION OF METHANE FROM HYDROCARBON GAS MIXTURES

No Drawing. Application filed May 27, 1929. Serial No. 366,521.

The present invention, as indicated, relates to the separation of methane from hydrocarbon gas mixtures and to its preparation in a purified condition substantially free from the accompaniment of other gaseous hydrocarbons.

A particular object of the invention is to provide a means of separating substantially pure methane from natural gas, although the method, as hereinafter described, is equally adapted to the separation of methane from other gas mixtures containing it in association with gaseous hydrocarbons of the saturated aliphatic series, or of the ethylene or acetylene series. Another object is to provide a method of the aforesaid character which may be easily and economically carried out in a relatively simple type of apparatus without need for employing pressure and extremely low temperatures on the one hand, or, on the other, temperatures sufficiently high to decompose any of the hydrocarbons present in the mixture to be treated.

As is well known, although methane is the principal constituent of natural gas, it is accompanied in most supplies by appreciable quantities of higher hydrocarbons of the saturated aliphatic series, chiefly ethane, with occasionally lesser amounts of propane, butane, etc. There is a great diversity in the composition of natural gas from various sources, the percentage of methane contained therein varying from as low as 60 per cent to as high as 99 per cent, and that of the higher hydrocarbons from around 1 per cent to as much as 30 per cent or more, while non-combustible constituents, such as nitrogen, carbon dioxide, etc. may also be present. Only in exceptional cases, however, does methane of high purity occur naturally. From the great majority of natural gas supplies the extraction of pure methane necessarily involves separation from accompanying ethane and higher hydrocarbons.

The usual methods employed for this purpose consist either in (1) refrigerating the raw gas to extremely low temperatures, with or without the aid of pressure, so as to liquefy it. and then fractionating the liquefied gas, or (2) heating the raw gas to a temperature sufficiently high to decompose the higher hydrocarbons while the more stable methane remains substantially unaltered. The first of the aforementioned methods demands the use of elaborate and costly equipment, which is also expensive to operate, and most frequently repeated fractionation is necessary in order to obtain methane of high purity. The second method referred to is based upon the fact that when the raw gas is heated to between 600 and 800° C. the hydrocarbons containing two or more C atoms are broken down into the corresponding unsaturated hydrocarbons of the ethylene series and hydrogen. The ethylene hydrocarbons may then be separated conveniently by known means, but the residual methane is admixed with the hydrogen, the separation of which is a difficult and costly proceeding. The presence of this hydrogen in the methane is a distinct drawback when it is desired to convert the latter into other chemical products.

Inasmuch as methane in recent years has acquired great industrial importance as the raw material for the synthetic manufacture of many useful and valuable chemical compounds, a simpler and less costly method for its separation in a relatively pure state from natural gas and other gas mixtures containing it is greatly to be desired.

We have now found that a simple and direct, yet highly effective, means to this end is afforded by the selective chlorination of such gas mixtures in the presence of a suitable catalyst whereby ethane and the higher hydrocarbons are converted to readily condensable chlorinated derivatives while the methane is substantially unattacked by chlorine under properly controlled operating conditions. By such mode of procedure the residual gas consists of a substantially pure methane free from admixture with hydrogen, and accompanied only by the inert constituents of the original gas, such as nitrogen, carbon dioxide, etc. To the accomplishment of the foregoing and related ends the invention, then, consists of the steps hereinafter fully described and particularly pointed out in the claims, the following description setting forth in detail certain procedure whereby the principle of the invention may be used.

Numerous methods have been proposed for the chlorination of natural gas or similar mixtures of gaseous hydrocarbons, either with or without a catalyst, the product of which is always a complicated mixture of more or less highly chlorinated derivatives of methane, ethane, etc., the greater tendency being for the formation of the higher, instead of the mono-, chlorinated derivatives. In general, such methods involve the reaction between chlorine and the gas at temperatures above 300° C. It has been observed that ethane and the higher hydrocarbons are more readily and extensively chlorinated under such conditions than is methane. In fact, to accomplish the partial chlorination of the greater part of the methane present, it is found that at the temperature necessary for reaction the higher hydrocarbons are almost, if not quite, completely chlorinated to solid products such as hexachlorethane and the like, which often cause serious operating difficulties by condensing in the pipes and condenser tubes and stopping them up, while hydrogen present is converted to hydrochloric acid, thus leading to an excessive consumption of chlorine and the formation of less valuable by-products.

We have now discovered a means and method whereby the aforesaid tendency of ethane and higher hydrocarbons to be chlorinated in preference to methane may be utilized to bring about the exclusive chlorination of the former in the presence of the latter, thus providing a direct and simple method for the separation of methane from accompanying hydrocarbon gases. We have found that in the presence of certain catalysts the action of chlorine upon hydrocarbon gas mixtures containing methane may be directed and controlled practically quantitatively to the chlorination of the higher hydrocarbons, while the methane remains practically unattacked. Among the catalysts that we have found adapted to the purpose are various anhydrous metallic chlorides, such as the chlorides of lead, iron, vanadium, copper, etc. Particularly favorable results have been obtained by the use of lead chloride, the catalyst preferably being prepared in a porous form as hereinafter described.

When the hydrocarbon gas mixture and chlorine, the latter being employed slightly in excess of one molecular proportion to the ethane and higher hydrocarbons present, are passed together through a bed of the catalyst at a temperature between 200° and 300° C., such ethane and higher hydrocarbons are quantitatively chlorinated, the products being chiefly the mono-chlor derivatives, such as ethyl chloride, with a smaller amount of di-chlor derivatives. The reacted mixture is conducted to a cooling and condensing system for the recovery of the liquid chlorinated hydrocarbons, and is then washed with water for the removal of hydrochloric acid and dried. The residual gas consists of methane accompanied only by the inert gases present in the original mixture By increasing the proportion of chlorine introduced to the reaction, a correspondingly larger proportion of dichlor- derivatives will be obtained in the product, but at the moderate temperature employed for the reaction there will be no appreciable formation of higher chlorinated derivatives. An excess of chlorine above that required for producing the dichlor- derivatives of ethane, etc., if used, will accordingly be found in the non-condensed gases along with the methane, when the operation is conducted within the aforesaid temperature limits, hence it is advisable to employ only so much chlorine as will be entirely consumed in the reaction. The temperature at the coldest part of the condensing system need be only low enough to condense ethyl chloride, which is the most volatile product of the chlorination. In practice most of the chlorinated products are condensed at about 0° C., while a final stage of cooling to about −20° C. effects the substantially complete removal of the last traces of ethyl chloride.

It is not necessary, however, to control the chlorination strictly within the temperature limits of 200° to 300° C. stated above. The upper limit of 300° C. may be considerably exceeded if only sufficient chlorine is present to react with the ethane and higher hydrocarbons present, as such reaction will go largely to completion, at least to the formation of di- or tri-chlor derivatives thereof, before any substantial chlorination of methane takes place. In fact, there will be no pronounced tendency toward the chlorination of methane simultaneously with the higher hydrocarbons below a temperature of about 400° C. In case the reacting gases in the proportions already stated pass through a lower temperature zone betwen 200° and 300° C. before reaching a zone above 300° C. the chlorination will be substantially complete before such higher temperature is attained. There is consequently little advantage in operating at higher temperatures than the preferred range already given, but such latter procedure may, nevertheless, be followed, if desired, without departing from the spirit of the invention.

An advantageous method of preparing the catalyst, e. g. lead chloride, in a highly porous form consists in mixing powdered lead chloride to a smooth paste with water or other suitable liquid medium. The paste is then placed on trays in a drier and slowly dried at a temperature of about 100° C. When thoroughly dry, the friable, porous mass is broken up into small pieces of about one-half inch diameter.

The catalyst is charged into a suitable receptacle which serves as the reaction chamber, said receptacle being provided with connections for introducing the gases and for taking off the reaction products. The entering gases, e. g. chlorine and natural gas, are preferably admitted to the reaction chamber through separate metered connections, the chamber being heated by suitable means to the reaction temperature. In passing through the catalyst bed the gases become thoroughly intermixed while simultaneously reaction occurs between chlorine and the higher hydrocarbons. The mixture of gases and vapors issuing from the chamber is then conducted to a condenser system for separation of the chlorinated hydrocarbons, thence to a water scrubber for removal of hydrochloric acid, and the residual gas, after drying, is collected in a suitable receiver or, if desired, subjected at once to further reaction for conversion into derivatives of methane.

As an illustrative example, a natural gas having the following analysis; $CH_4$—86.6 per cent., $C_2H_6$—3.1 per cent., $N_2$—10.1 per cent., was chlorinated at a temperature between 230° and 270° C. in the presence of a lead chloride catalyst prepared as described above. The natural gas was introduced at the rate of 750 cubic centimeters per minute, and the chlorine at the rate of 40 cubic centimeters per minute for a period of 5¾ hours, during most of the time the temperature being held closely around 258° C., the temperature being measured by a thermocouple inserted at the middle section of the catalyst zone. A total of 185.2 grams natural gas and 44.0 grams chlorine was consumed. From the reaction product a quantity of 23.6 grams of chlorinated products was separated, consisting of 95 per cent. ethyl chloride and 5 per cent. of a mixture of higher chlorinated derivatives having a specific gravity of 1.130 at 20° C., and the solution from the water scrubber contained 22.14 grams hydrochloric acid. The residual gas upon analysis contained approximately 90 per cent. methane and 10 per cent. nitrogen, and was free from ethane.

To summarize, in carrying out our invention, we admix a regulated current of dry chlorine gas with a like regulated current of the methane gas mixture, either or both of which may be preheated before admixture, or we may heat same after admixture. The mixed gas current will then be brought into contact with the catalyst, preferably by passing a regulated current of the mixture through or in contact with a granular mass of said catalyst or in contact with a suitable catalyst-impregnated carrier mass. The catalyst will preferably be contained in a suitable metal vessel, such as a tube or an annular space between an outer and inner tube or in other suitable container adapted to permit contacting said mass with the gaseous mixture in a heat zone. A thermocouple or other temperature indicating device will be installed to indicate temperature at some selected point in the heat zone such as, for instance, a point in the contact mass or one in the gas stream issuing from the contact mass. Heating means will be provided to supply heat to the contact mass and/or gaseous mixture. The heat input which may be obtained from an electric resistor heater or from the combustion of fuel, or otherwise, will be controlled. The character of the gases issuing from the catalyst will be determined to ascertain if any of the methane has been chlorinated and if the higher hydrocarbons have or have not been chlorinated. Based upon such determination, the ratio of heat input to gas treated may be varied and the character of the reacted gas again determined until a temperature indication or a temperature range indication has been found, at which temperature, or within which range of temperature, the chlorination will be substantially confined to the higher hydrocarbons. The chlorination will then proceed, the rate of heat input or the ratio of heat input to gas treated being controlled to maintain said determined temperature indication or a temperature indication within said determined range, whereby the reacted mixture will continue to contain the methane substantially unreacted with chlorine while substantially all of the higher hydrocarbons are chlorinated to form readily condensible products. The point in the heat zone at which the temperature will be taken is immaterial so long as such temperature indication affords a guide for the control of the process. The temperature indication may be taken in the gas stream or in the catalyst bed or in certain arrangements of apparatus at other points. We have thus described in detail a method of procedure to start up and maintain the operation of our method in order to avoid uncertainty or indefiniteness and to disclose a method of temperature control whereby the chlorination is done selectively as described. In our experiments the thermocouple element was buried in the catalytic mass and the temperature range herein given as between 200 and 300° C., is the temperature range indicated by the thermocouple so located, but in the actual carrying out of our process it is not necessary to know the temperature of the gases in the reaction zone provided a certain temperature indication is made at any other suitable point in the system which, when maintained at the required value by control of the ratio of heat input to the volume of gas treated, will be evidence of the desired selective chlorination of the higher hydrocarbons.

Our improved method affords an easily controllable simple and direct procedure for separating methane from natural gas and other gas mixtures containing it, which is operable within a moderate temperature range and does not require the use of high pressure, as in methods heretofore employed. Ethane and higher gaseous hydrocarbons present may be quantitatively converted to chlorinated derivatives in a single passage through the catalytic reaction zone, and the action is so selective that substantially no chlorination of methane occurs under properly controlled conditions. The chlorinated derivatives produced are readily separated from the residual gases by means of the usual type of condensing equipment and at minimum cooling temperatures not greatly below 0° C. At the chlorination temperatures preferably employed the ethane derivatives obtain consist chiefly of valuable mono- and di-substitution products, e. g. ethyl chloride, dichlorethane, etc., instead of the less valuable higher chlorinated derivatives, such as hexachlorethane. The methane product is substantially free from other hydrocarbon gases or hydrogen, being accompanied only by inert gases, if any, contained in the original gas mixture. It is consequently of a quality exceptionally well adapted to further reaction for the production of methane derivatives, as by chlorination at higher temperature, etc., the products from such further operations being obtained free from contamination with derivatives of higher hydrocarbons. The latter feature is of great practical significance, due to the fact that, when impure methane is chlorinated, for instance, the higher temperatures, e. g. above 300° C., necessarily employed bring about the chlorination of ethane and higher hydrocarbons present to form highly chlorinated bodies solid at ordinary temperature, such as hexachlorethane, which are solidified in the condensing system, thereby causing operating difficulties due to stoppages. The latter disadvantage is entirely avoided when the impure methane, previous to chemical reaction, is submitted to a preliminary purification treatment in accordance with the method herein described. The cost of such purification carried out in this way is relatively low, and is largely borne by the valuable by-products formed, so that the purified methane may be made available for industrial chemical purposes by means of our improved method at a net cost not appreciably greater than that of the impure raw gas.

Other modes of applying the principle of our invention may be employed instead of those explained, change being made as regards the method herein disclosed, provided the means stated by any of the following claims or the equivalent of such stated means be employed.

We therefore particularly point out and distinctly claim as our invention:—

1. The method of purifying methane from ethane and higher gaseous hydrocarbons which comprises reacting the mixed gases at a temperature approximately between 200° and 400° C. with chlorine in amount only sufficient to combine with such ethane and higher hydrocarbons and in the presence of a chlorinating catalyst.

2. The method of purifying methane from ethane and higher gaseous hydrocarbons which comprises reacting the mixed gases at a temperature approximately between 200° and 400° C. with chlorine in amount only sufficient to combine with such ethane and higher hydrocarbons and in the presence of a chlorinating catalyst consisting of an anhydrous metallic chloride.

3. The method of purifying methane from ethane and higher gaseous hydrocarbons which comprises reacting the mixed gases at a temperature approximately between 200° and 400° C. with chlorine in amount only sufficient to combine with such ethane and higher hydrocarbons and in the presence of lead chloride.

4. The method of preparing substantially pure methane from natural gas and the like which comprises treating such gas with chlorine in amount approximately equivalent to the hydrocarbons of higher molecular weight than methane contained therein, contacting the mixed gases with a body of a chlorinating catalyst in a heated reaction zone maintained at a temperature between about 200° and 400° C., cooling the reacted gases to condense chlorinated derivatives of ethane and higher hydrocarbons formed therein, separating the latter from the residual gases, washing such gases with water and drying the purified methane obtained thereby.

5. The method of preparing substantially pure methane from natural gas and the like which comprises treating such gas with chlorine in amount approximately equivalent to the hydrocarbons of higher molecular weight than methane contained therein, contacting the mixed gases with a body of lead chloride at a temperature between about 200° and 300° C., cooling the reacted gases to condense chlorinated derivatives of ethane and higher hydrocarbons formed therein, separating the latter from the residual gases, washing such gases with water and drying the purified methane obtained thereby.

6. In a method of separating methane from higher hydrocarbons contained in gas mixtures such as natural gas and the like, the step which consists in chlorinating such higher hydrocarbons without substantial chlorination of methane by contacting such gas mixture with chlorine not in excess of the amount that will react with such higher hydrocarbons while maintaining the mixed gases at a temperature between 200° and 300° C. in the presence of a chlorinating catalyst consisting of an anhydrous metallic chloride.

7. In a method of separating methane from higher hydrocarbons contained in gas mixtures such as natural gas and the like, the step which consists in chlorinating such higher hydrocarbons without substantial chlorination of methane by contacting such gas mixture with chlorine not in excess of the amount that will react with such higher hydrocarbons while maintaining the mixed gases at a temperature between 200° and 300° C. in the presence of lead chloride as catalyst.

8. The method of separating methane from higher hydrocarbons contained in gas mixtures such as natural gas and the like which comprises chlorinating such higher hydrocarbons without substantial chlorination of methane by subjecting such gas mixture to the action of chlorine not in excess of the amount that will react with such higher hydrocarbons while maintaining the mixed gases at a temperature between 200° and 300° C. in the presence of a chlorinating catalyst consisting of an anhydrous metallic chloride, cooling the reacted gases to condense and separate chlorinated higher hydrocarbons and recovering the purified methane from the residual gases.

9. The method of separating methane from higher hydrocarbons contained in gas mixtures such as natural gas and the like which comprises chlorinating such higher hydrocarbons without substantial chlorination of methane by subjecting such gas mixture to the action of chlorine not in excess of the amount that will react with such higher hydrocarbons while maintaining the mixed gases at a temperature between 200° and 300° C. in the presence of a chlorinating catalyst consisting of an anhydrous metallic chloride, cooling the reacted gases to condense and separate chlorinated higher hydrocarbons, washing the residual gases with water and drying the purified methane thereby obtained.

10. The method of separating methane from higher hydrocarbons contained in gas mixtures such as natural gas and the like which comprises chlorinating such higher hydrocarbons without substantial chlorination of methane by subjecting such gas mixture to the action of chlorine not in excess of the amount that will react with such higher hydrocarbons while maintaining the mixed gases at a temperature between 200° and 300° C. in the presence of lead chloride as catalyst, cooling the reacted gases to condense and separate chlorinated higher hydrocarbons, washing the residual gases with water and drying the purified methane thereby obtained.

Signed by us this 20 day of May, 1929.

EDGAR C. BRITTON.
RALPH F. PRESCOTT.